March 2, 1937.  A. BRUNO  2,072,794
EGG HOLDER
Filed Dec. 5, 1935  2 Sheets-Sheet 1
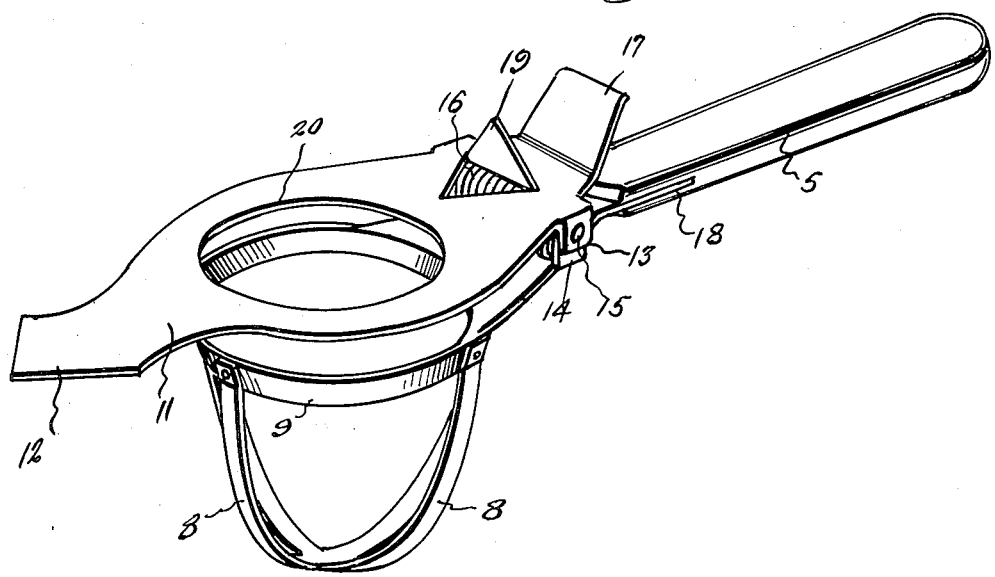
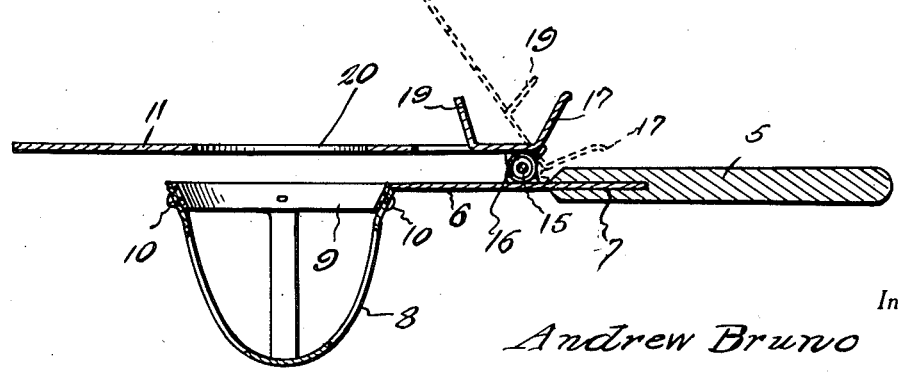
Inventor
Andrew Bruno
By Clarence A O'Brien and
Hyman Berman
Attorneys

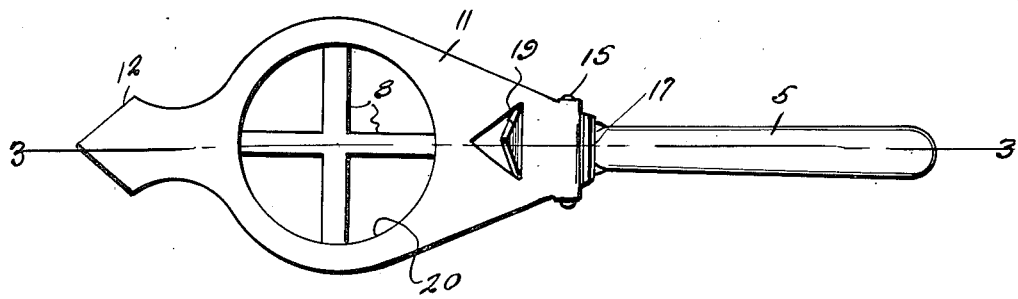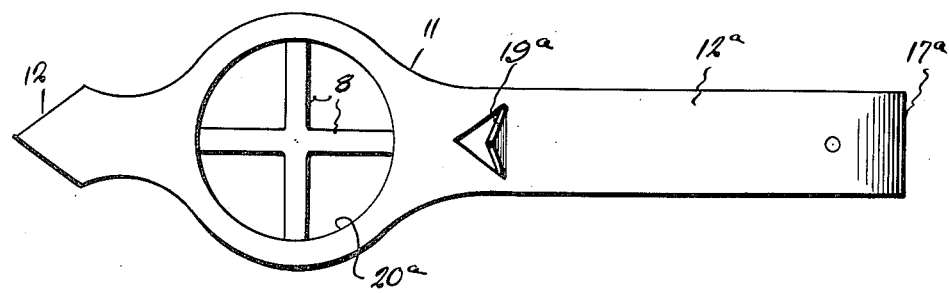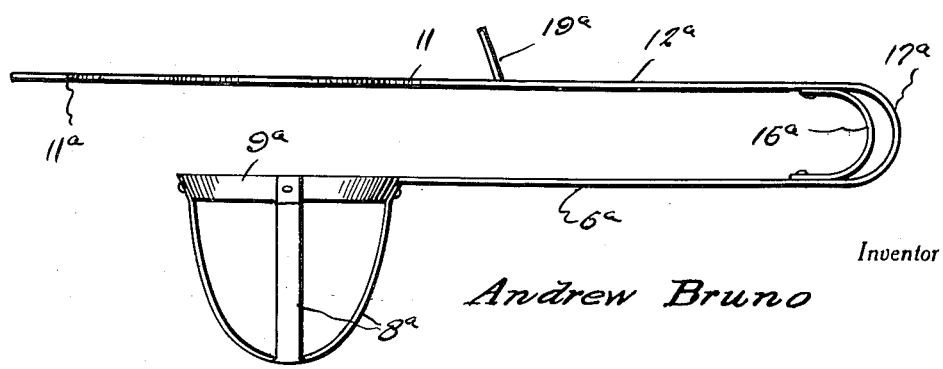

Patented Mar. 2, 1937

2,072,794

UNITED STATES PATENT OFFICE 2,072,794

EGG HOLDER

Andrew Bruno, New York, N. Y.

Application December 5, 1935, Serial No. 53,080

3 Claims. (Cl. 65—12)

This invention appertains to new and useful improvements in egg holders.

The principal object of the present invention is to provide an egg holder whereby hot eggs can be held firmly without likelihood of burning the hand while the egg is being opened for serving.

During the course of the following specification other important objects and advantages of the invention will become apparent to the reader.

In the drawings:

Figure 1 represents a perspective view of the implement.

Figure 2 is a top plan view of the device.

Figure 3 represents a longitudinal sectional view taken substantially on line 3—3 of Figure 2.

Figure 4 represents a top plan view of a modified form of the invention.

Figure 5 represents a side elevational view of the modification shown in Figure 4.

Referring to the drawings wherein like numerals designate like parts, it can be seen in Figure 1 that numeral 5 represents the handle which has one end of the elongated tongue 6 embedded therein as at 7. The outer end of this tongue 6 attaches to the egg receiving cage which consists in the construction of a T-shaped extension for the tongue 6 the members of which are curved upwardly to define spokes 8. The tapering ring 9 is secured to the upper ends of the spokes 8 as at 10. Thus the cage for the egg is formed.

The retainer for the eggs consist of the elongated plate 11 preferably pointed at one end as at 12. The opposite end of this plate 11 is provided with downturned ears 13. The tongue 6 is provided with upstanding ears 14 and as is shown in Figure 1, a pin 15 is disposed through the ears 13 and 14 which interlap as shown. A spring 16 is convoluted on the pin 15 and has one end engaging behind the finger protuberance 17 on the plate 11 while its opposite end engages one side of the handle 5 as denoted by numeral 18 in Figure 1. Thus the plate 11 is maintained in the position shown in Figure 1 in a position in close proximity to the ring 9.

Struck from the plate 11 at its pivot point is the triangular shaped tongue 19 which extends upwardly so as to form a knife stop so as to keep persons' fingers from being cut.

A circular opening 20 is provided in the plate 11 through which an egg supported in the cage can protrude. The pointed extension 12 of the plate 11 serves as a guide on which a knife can be slid for slicing off or breaking off the small end portion of an egg preparatory to serving the same. The plate 11 is first lifted to the dotted line position shown in Figure 3 to permit insertion of the egg into the cage.

A slightly modified form of the invention is shown in Figures 4 and 5 wherein the tongue 6a is provided with the same form of cage consisting of the spokes 8a and the tapering ring 9a. This tongue 6a is preferably of spring metal and is bent backwardly over top of itself as shown at 12a and formed with the opening 20a corresponding to the opening 20 in the plate 11. The backwardly bent portion 12a has the pointed extension 11a and is struck out to provide the knife guard 19a, while a supplemental spring 16a is provided near the bight 17a between the tongue 6a and the backwardly disposed portion 12a to serve to maintain the portion with the opening 20a therein thrown outwardly with respect to the cage.

The foregoing specification sets forth the invention in specific terms, it is to be understood that numerous changes in the shape, size and materials may be resorted to without departing from the spirit or scope of the invention as claimed hereinafter.

Having thus described the invention, what I claim as new is:

1. An egg holder comprising a handle, a cage supported by the handle for containing a hot egg, a plate pivotally supported on the handle and having an opening therein through which a portion of an egg can project, and means for removing the said plate from a position close to the cage, said means for supporting the plate consisting of a pivotal connection between the plate and the handle, an extension on said plate forming a knife guide, a knife stop on the plate in advance of the handle and spring means associated with the pivot connection whereby the plate is normally urged toward the cage.

2. An egg holder comprising a handle, a cage supported by the handle for containing a hot egg, a plate pivotally supported on the handle and having an opening therein through which a portion of an egg can project, and means for removing the said plate from a position close to the cage, an extension on said plate forming a knife guide and a knife stop struck up from the plate in advance of the handle.

3. An egg holder comprising a handle, a cage supported by the handle for containing a hot egg, a plate pivotally supported on the handle and having an opening therein through which a portion of an egg can project, an extension on said plate forming a knife guide and a knife stop struck up from the plate in advance of the handle and an upturned extension on the plate adjacent the handle for manipulating the plate.

ANDREW BRUNO.